F. B. SHAW.
CARRIAGE GUARD.
No. 62,569. Patented Mar. 5, 1867.
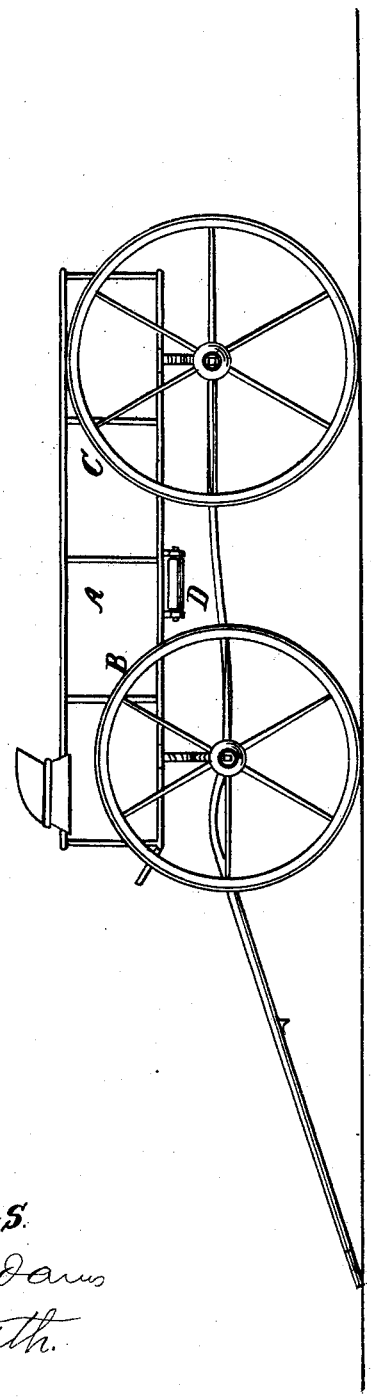
Witnesses
J. H. Adams
G. A. C. Smith.
Inventor
F. B. Shaw.

United States Patent Office.

FREDERIC B. SHAW, OF BOSTON, MASSACHUSETTS, ASSIGNOR TO SILAS S. SHAW, OF BATH, MAINE.

Letters Patent No. 62,569, dated March 5, 1867.

IMPROVEMENT IN CARRIAGE GUARD.

The Schedule referred to in these Letters Patent and making part of the same.

TO ALL WHOM IT MAY CONCERN:

Be it known that I, FREDERIC B. SHAW, of Boston, in the county of Suffolk, and State of Massachusetts, have invented a new and useful Improvement in Carriage Guards, of which the following is a full, clear, and exact description, reference being had to the accompanying drawings, making part of this specification, and representing the mode of applying my invention.

My invention consists in the attachment, to the sides of a carriage or any four-wheeled vehicle, at a point where the rim or tire of the front wheels is liable to come in contact with the same in turning or backing the vehicle, of an anti-friction roller, made of India rubber, gutta percha, or any of the compounds of the same, for the purpose of preventing the wheels from locking or bearing against and injuring the sides of the vehicle, and also of facilitating the turning of the wheels.

Referring to the drawing, A represents the body of the vehicle, and B C the forward and hind wheels respectively. At a point where the front wheels B come in contact with the lower part of the body of the wagon, in turning or backing the same, is a cylindrical piece of India rubber or gutta percha provided with a shaft which is journalled so as to turn freely in bearings firmly attached in any convenient manner to the body of the vehicle, and serving as an anti-friction roller when in contact with the rim or edge of the wheel.

It has been usual to attach to the sides of a vehicle a fixed projecting piece of iron or guard to prevent the wheel from bearing against the body of the vehicle, and to protect it from injury, but in turning a short corner in vehicles thus provided, there is considerable friction and a tendency to lock the wheels, and in case the vehicle is heavily loaded it is often difficult to turn the wheel when in contact with such guard or wear-iron, and often renders the vehicle liable to upset.

I am aware that a roller made of metal has been used in the place of a wear-iron, but this is objectionable, and not likely to come into general use, for the reason that after being used a short time the bearings of the journals will become worn, and consequently occasion a noise or rattling when the vehicle is in motion. Attempts have been made to obviate this objection by the employment of a spring placed within a cylindrical metal roller, but such a device is liable to interfere with the free action of the roller, besides presenting other obvious objections. In my invention it is believed that these objections are obviated.

What I claim, therefore, and desire to secure by Letters Patent, is—

A carriage guard, made of India rubber or its equivalent substance, as and for the purpose specified.

In testimony whereof I have signed my name to this specification in the presence of two subscribing witnesses.

F. B. SHAW.

Witnesses:
    J. H. ADAMS,
    J. O. HULL.